United States Patent
Xu

(10) Patent No.: US 12,050,334 B2
(45) Date of Patent: Jul. 30, 2024

(54) BACKLIGHT MODULE AND DISPLAY DEVICE

(71) Applicant: SHENZHEN CHINA STAR OPTOELECTRONICS SEMICONDUCTOR DISPLAY TECHNOLOGY CO., LTD., Shenzhen (CN)

(72) Inventor: Haotian Xu, Shenzhen (CN)

(73) Assignee: SHENZHEN CHINA STAR OPTOELECTRONICS SEMICONDUCTOR DISPLAY TECHNOLOGY CO., LTD., Guangdong (CN)

(*) Notice: Subject to any disclaimer, the term of this patent is extended or adjusted under 35 U.S.C. 154(b) by 138 days.

(21) Appl. No.: 17/599,502

(22) PCT Filed: Jun. 15, 2021

(86) PCT No.: PCT/CN2021/099945
§ 371 (c)(1),
(2) Date: Sep. 28, 2021

(87) PCT Pub. No.: WO2022/252284
PCT Pub. Date: Dec. 8, 2022

(65) Prior Publication Data
US 2023/0221480 A1 Jul. 13, 2023

(30) Foreign Application Priority Data
Jun. 2, 2021 (CN) .......................... 202110615374.4

(51) Int. Cl.
*F21V 8/00* (2006.01)
*G02F 1/1335* (2006.01)

(52) U.S. Cl.
CPC .......... *G02B 6/0031* (2013.01); *G02B 6/0028* (2013.01); *G02B 6/0068* (2013.01); *G02F 1/133626* (2021.01)

(58) Field of Classification Search
CPC ............ G02F 1/133626; G02B 6/0028; G02B 6/0031; G02B 6/0068
See application file for complete search history.

(56) References Cited

U.S. PATENT DOCUMENTS 9,772,438 B2 * 9/2017 Chu ..................... G02B 6/0021
10,605,974 B2   3/2020 Wang
(Continued)

FOREIGN PATENT DOCUMENTS

CN    203744045 U    7/2014
CN    104880760 A    9/2015
(Continued)

OTHER PUBLICATIONS

Chinese Office Action in corresponding Chinese Patent Application No. 202110615374.4 dated Dec. 30, 2021, pp. 1-7.
(Continued)

*Primary Examiner* — Alexander K Garlen
(74) *Attorney, Agent, or Firm* — PV IP PC; Wei Te Chung; Zhigang Ma

(57) ABSTRACT

A backlight module and a display device are disclosed. The backlight module includes a light guide structure and a light source. The light source includes a first light-emitting assembly and a second light-emitting assembly. A light receiving structure is disposed behind and corresponding to a position of the first light-emitting assembly and is configured to concentrate light emitted by the first light-emitting assembly within a predetermined angle range so that the light is directed outward from the light receiving structure. The light guide structure is disposed behind and correspond-
(Continued)

ing to a position of the light receiving structure and is configured to direct outward the light concentrated in the light receiving structure through specular reflection.

14 Claims, 11 Drawing Sheets

(56) References Cited

U.S. PATENT DOCUMENTS

| | | | | |
|---|---|---|---|---|
| 2012/0155109 | A1* | 6/2012 | Hayashi | G02B 6/0068 362/613 |
| 2017/0160459 | A1* | 6/2017 | Liu | G02B 6/003 |
| 2017/0160461 | A1* | 6/2017 | Liu | G02B 6/0023 |
| 2021/0325731 | A1* | 10/2021 | Li | G02F 1/133626 |

FOREIGN PATENT DOCUMENTS

| | | | | |
|---|---|---|---|---|
| CN | 106932854 | A | | 7/2017 |
| CN | 207301564 | U | | 5/2018 |
| CN | 108897169 | A | | 11/2018 |
| CN | 112835216 | A | | 5/2021 |
| CN | 110189628 | B | * | 1/2023 ............... G09F 9/00 |
| DE | 202020100855 | U1 | * | 7/2021 |
| TW | 201516492 | A | * | 5/2015 |
| TW | 201516492 | A | | 5/2015 |

OTHER PUBLICATIONS

International Search Report in International application No. PCT/CN2021/099945, dated Jan. 26, 2022.
Written Opinion of the International Searching Authority in International application No. PCT/CN2021/099945, dated Jan. 26, 2022.

* cited by examiner

BACKLIGHT MODULE AND DISPLAY DEVICE

RELATED APPLICATIONS

This application is a Notional Phase of PCT Patent Application No. PCT/CN2021/099945 having international filing date Jun. 15, 2021, which claims the benefit of priority of Chinese Patent Application No. 202110615374.4 filed on Jun. 2, 2021. The contents of the above applications are all incorporated by reference as if fully set forth herein in their entirety.

BACKGROUND OF INVENTION

1. Field of Invention

The present invention relates to a technical field of displays, and particularly to a backlight module and a display device.

2. Related Art

With development of technologies, liquid crystal display devices have been widely used in various fields. Traditional liquid crystal display devices have large viewing angles, but cannot meet users' needs for information security.

Currently, viewing angle adjustable privacy display technologies mainly include two types: the first type solution is that privacy films having blind micro structures and variable haze liquid crystal films are provided between backlight modules and display panels to switch viewing angles. The second type solution is that third electrodes are provided in display panels to control viewing angle switching of the display panels. Among them, the first type solution has low light energy utilization and high energy consumption, which is not good to be used on mobile devices, and the second type solution has low front-view contrast and poor display effects.

SUMMARY OF INVENTION

The embodiments of the present application provide a backlight module and a display device to solve a technical problem of low light energy utilization or low contrast of display panels caused by conventional viewing angle adjustable privacy display structures.

An embodiment of the present application provides a backlight module, comprising a light source comprising a first light-emitting assembly and a second light-emitting assembly; a light receiving structure disposed behind and corresponding to a position of the first light-emitting assembly and configured to concentrate light emitted by the first light-emitting assembly within a predetermined angle range so that the light is directed outward from the light receiving structure; and a light guide structure disposed behind and corresponding to a position of the light receiving structure and configured to direct outward the light concentrated in the light receiving structure through specular reflection.

In the backlight module provided by an embodiment of the present application, the light receiving structure comprises at least a light receiving element comprising a light incident surface disposed close to the first light-emitting assembly, a light output surface disposed close to the light guide structure, and a light-receiving curved surface disposed between the light incident surface and the light output surface, wherein the light-receiving curved surface concentrates light incident on the light-receiving curved surface within the predetermined angle range so that the light is directed outward from the light output surface.

In the backlight module provided by an embodiment of the present application, a cross-sectional shape of the light-receiving curved surface perpendicular to the light incident surface or the light output surface is one of a parabola, a polynomial curve, a Bezier curve, or a B-spline curve.

In the backlight module provided by an embodiment of the present application, the first light-emitting assembly comprises a plurality of first light-emitting diode (LED) devices, the second light-emitting assembly comprises a plurality of second LED devices, and the light receiving structure comprises a plurality of the light receiving elements provided in a one-to-one correspondence with the first LED devices.

In the backlight module provided by an embodiment of the present application, the first LED devices and the second LED devices are alternately arranged, and one of the second LED devices is disposed between any adjacent ones of the first LED devices.

In the backlight module provided by an embodiment of the present application, the light guide structure comprises a reflective bottom surface, a light output surface located on a side opposite to the reflective bottom surface, and a light introducing surface located between the reflective bottom surface and the light output surface and close to one side of the light source; and wherein the reflective bottom surface comprises at least a reflective surface protruding outward from the light guide structure, and the reflective surface is disposed at an acute angle with respect to the light output surface and the light introducing surface.

In the backlight module provided by an embodiment of the present application, the light guide structure comprises a reflective bottom surface, a light output surface located on a side opposite to the reflective bottom surface, and a light introducing surface located between the reflective bottom surface and the light output surface and close to one side of the light source; and wherein the reflective bottom surface comprises at least a reflective surface protruding outward from the light guide structure, and the reflective surface is disposed at an acute angle with respect to the light output surface and the light introducing surface.

In the backlight module provided by an embodiment of the present application, the reflective bottom surface further comprises a plurality of second reflective surfaces facing away from the light introducing surface and disposed in a direction toward the light output surface, wherein the first reflective surfaces and the second reflective surfaces are connected and disposed symmetrically with respect to each other, wherein the light guide structure further comprises a specular reflection surface disposed in cooperation with the second reflection surface and located opposite to the light introducing surface.

In the backlight module provided by an embodiment of the present application, the backlight module further comprises a reverse prism sheet, and the reverse prism sheet is disposed on a side of the light guide structure close to the light output surface.

Correspondingly, an embodiment of the present application further provides a display device, which includes the backlight module as described above, and a display panel disposed on the backlight module.

The present application has advantageous effects as follows: in the embodiments of the present application, the light source is divided into a first light-emitting assembly and a second light-emitting assembly, and a light receiving structure is disposed between the first light-emitting assembly and the light guide structure. By using the light receiving structure to concentrate light emitted by the first light-emitting assembly within the predetermined angle range such that the light is incident to an inside of the light guide structure, in cooperation with the light guide structure to direct outward the light through the specular reflection, and on the basis of a privacy display function, a display device can have higher light energy utilization and contrast. Furthermore, by switching working states of the first light-emitting assembly and the second light-emitting assembly, a privacy display effect with a switchable viewing angle is also achieved.

BRIEF DESCRIPTION OF DRAWINGS

To describe the technical solutions in the embodiments of the present invention, the following briefly introduces the accompanying drawings for describing the embodiments. Apparently, the accompanying drawings in the following description show merely some embodiments of the present invention, and a person skilled in the art may still derive other drawings from these accompanying drawings without creative efforts.

DESCRIPTION OF PREFERRED EMBODIMENTS

Figure 1:
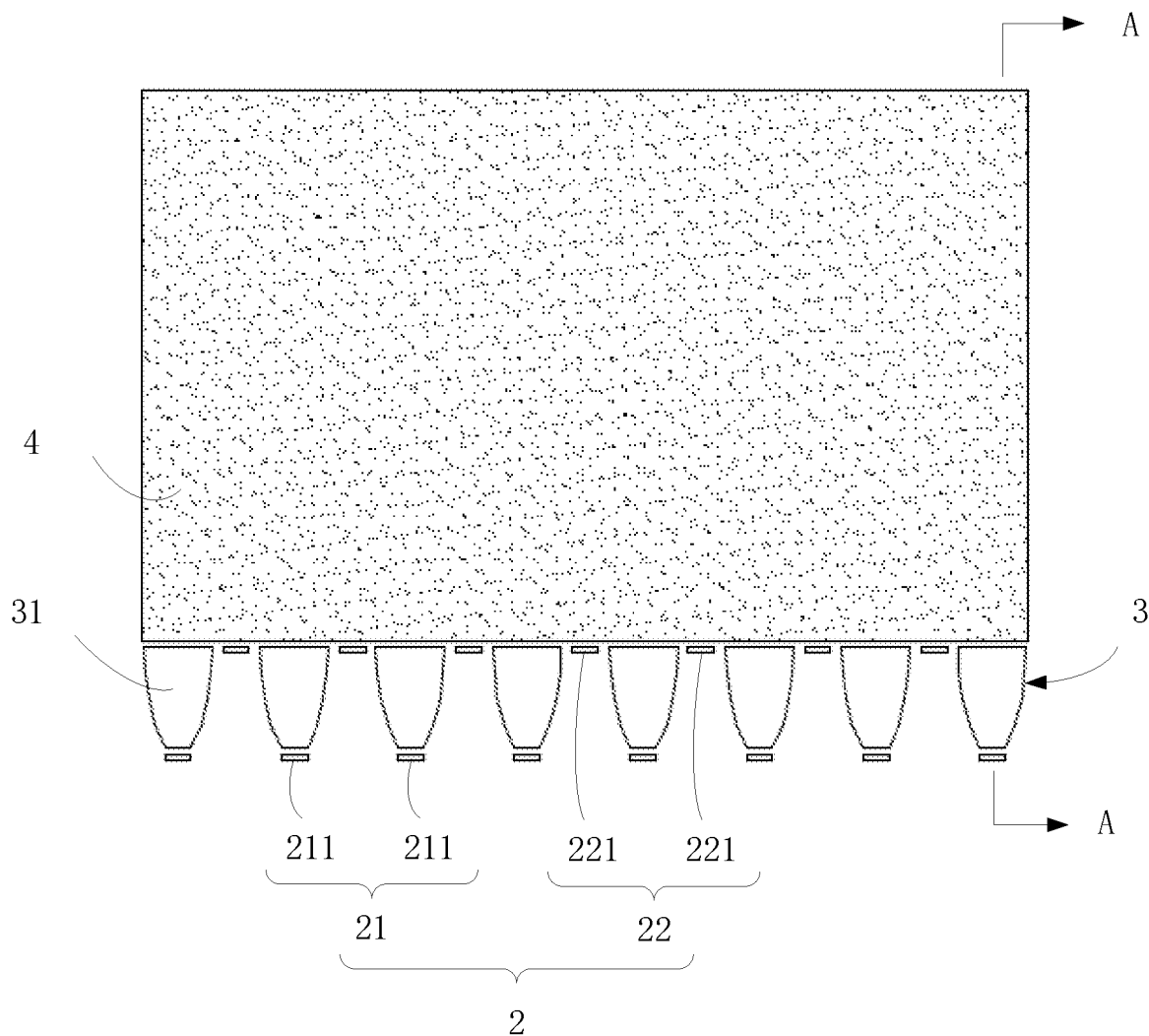
FIG. 1 is a first top plan view of a backlight module provided by an embodiment of the present application.

The following embodiments are referring to the accompanying drawings for exemplifying specific implementable embodiments of the present invention. Directional terms described by the present invention, such as upper, lower, front, back, left, right, inner, outer, side, etc., are only directions by referring to the accompanying drawings, and thus the used directional terms are used to describe and understand the present invention, but the present invention is not limited thereto. In the drawings, units with similar structures are indicated by the same reference numerals.

In the description of this application, it should be understood that the terms "first" and "second" are only used for descriptive purposes and are not to be construed as indicating or implying relative importance. Thus, features defining "first" or "second" may include one or more of the described features either explicitly or implicitly. In the description of the present invention, the meaning of "a plurality" is two or more unless specifically and specifically defined otherwise.

In the present invention, unless otherwise explicitly specified or limited, the terms "mounted", "linked", "connected", and like terms are to be broadly understood. For example, it may be a fixed connection, a detachably connection, or an integrally connection, or may be a mechanical connection, electrically connection, or a directly connection. Alternatively, it can also be connected indirectly through intervening structures, or may be interaction between the two internal communicating elements or two elements. Those of ordinary skill in the art, to be understood that the specific meanings in the present invention in accordance with specific circumstances.

The technical solution of the present application will now be described in combination with specific embodiments.

Figure 2:
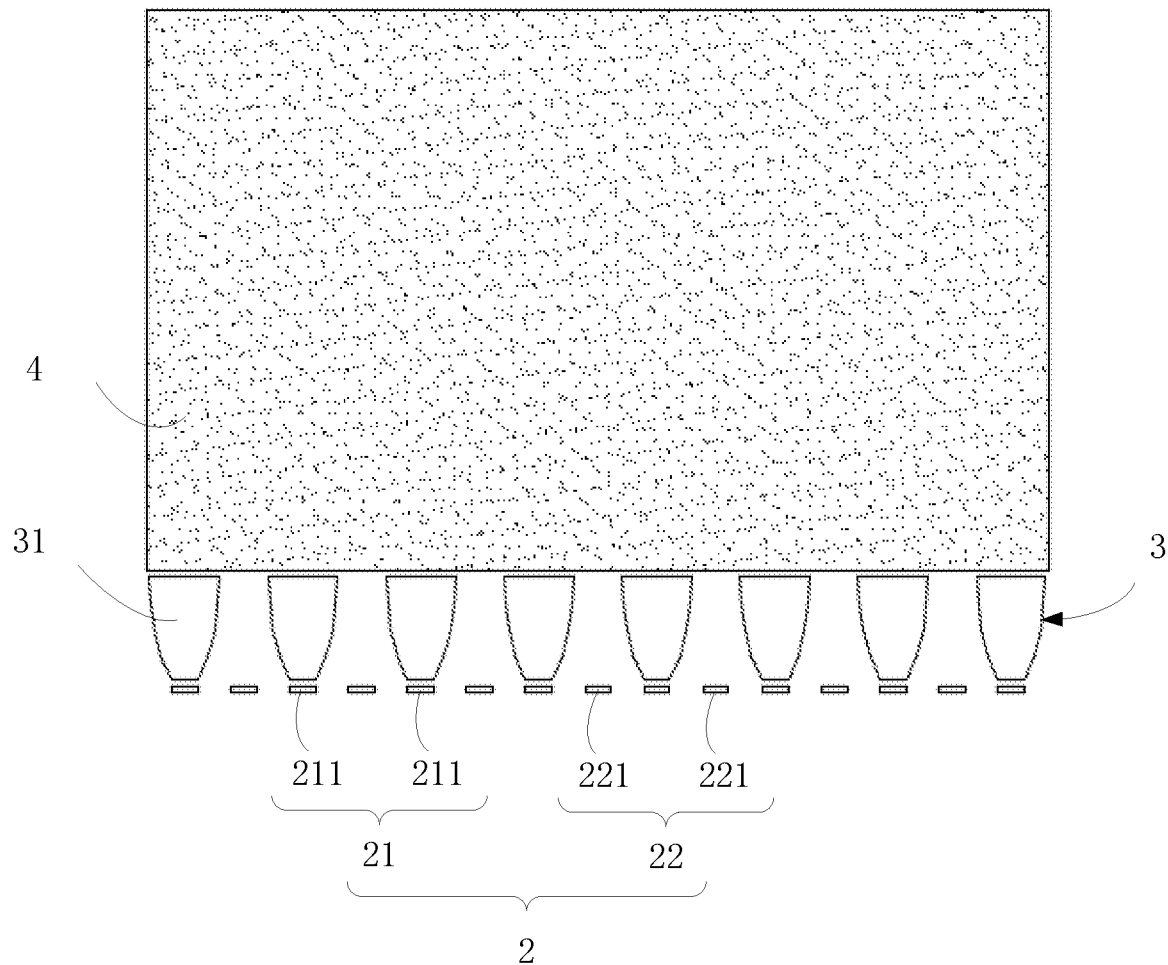
FIG. 2 is a second top plan view of the backlight module provided by an embodiment of the present application.
Figure 3:
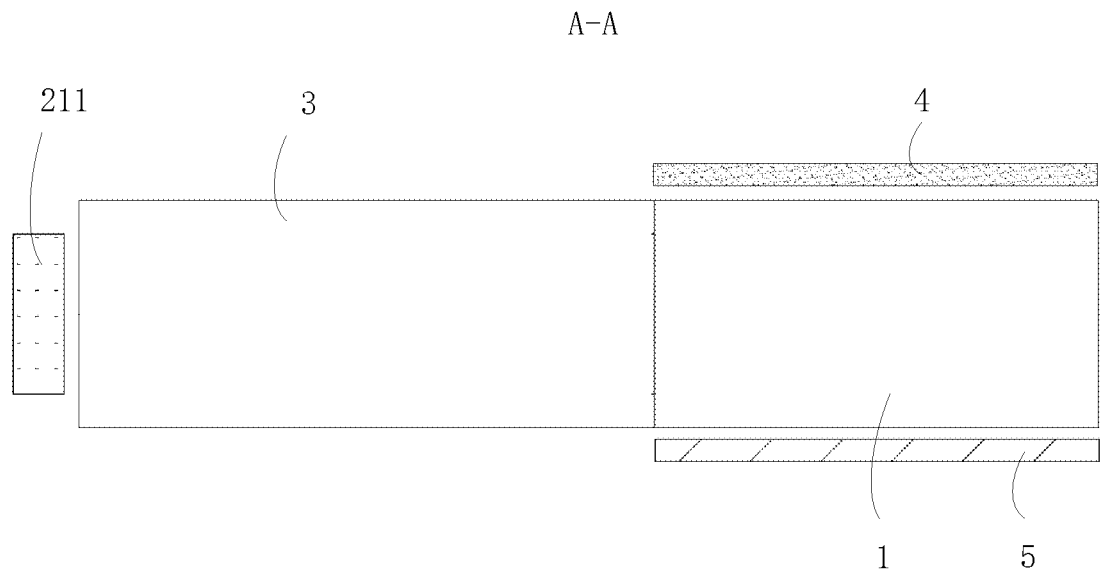
FIG. 3 is a schematic cross-sectional view of the backlight module taken along line A-A of FIG. 1.

Please refer to FIG. 1 to FIG. 3, an embodiment of the present application provides a backlight module, including:
- a light source 2 including a first light-emitting assembly 21 and a second light-emitting assembly 22;
- a light receiving structure 3 disposed behind and corresponding to a position of the first light-emitting assembly 21 and configured to concentrate light emitted by the first light-emitting assembly 21 within a predetermined angle range so that the light is directed outward from the light receiving structure 3; and
- a light guide structure 1 disposed behind and corresponding to a position of the light receiving structure 3 and configured to direct outward the light concentrated in the light receiving structure 3 through specular reflection.

It can be understood that currently, viewing angle adjustable privacy display technologies mainly include two types. The first type solution is that a privacy film having a blind micro structure and a variable haze liquid crystal film are provided between the backlight module and the display panel to switch viewing angles. The second type solution is that a third electrode is provided in the display panel to control viewing angle switching of the panel. Specifically, the first type solution has low light energy utilization and high energy consumption, which is not good to be used on mobile devices, and the second type solution has low front-view contrast and poor display performance. In this embodiment, the light source 2 is divided into a first light-emitting assembly 21 and a second light-emitting assembly 22, and a light receiving structure 3 is disposed between the first light-emitting assembly 21 and the light guide structure 1. By using the light receiving structure 3 to concentrate light emitted by the first light-emitting assembly 21 within the predetermined angle range such that the light is incident to an inside of the light guide structure 1, in cooperation with the light guide structure 1 to direct outward the light through the specular reflection, and on the basis of a privacy display function, a display device can have higher light energy utilization and contrast. Furthermore, by switching working states of the first light-emitting assembly 21 and the second light-emitting assembly 22, a privacy display effect with a switchable viewing angle is also achieved.

As described above, the backlight module can achieve different backlight modes by switching the working states of the first light-emitting assembly 21 and the second light-emitting assembly 22. In this embodiment, the backlight modes include a privacy mode, a wide-angle mode, and a high-brightness mode. Specifically, in the wide-angle mode, the second light-emitting assembly 22 is driven and the first light-emitting assembly 21 is turned off; in the privacy mode, the first light-emitting assembly 21 is driven and the second light-emitting assembly 22 is turned off; and in the high-brightness mode, both the second light-emitting assembly 22 and the first light-emitting assembly 21 are driven at a same time.

Figure 4:
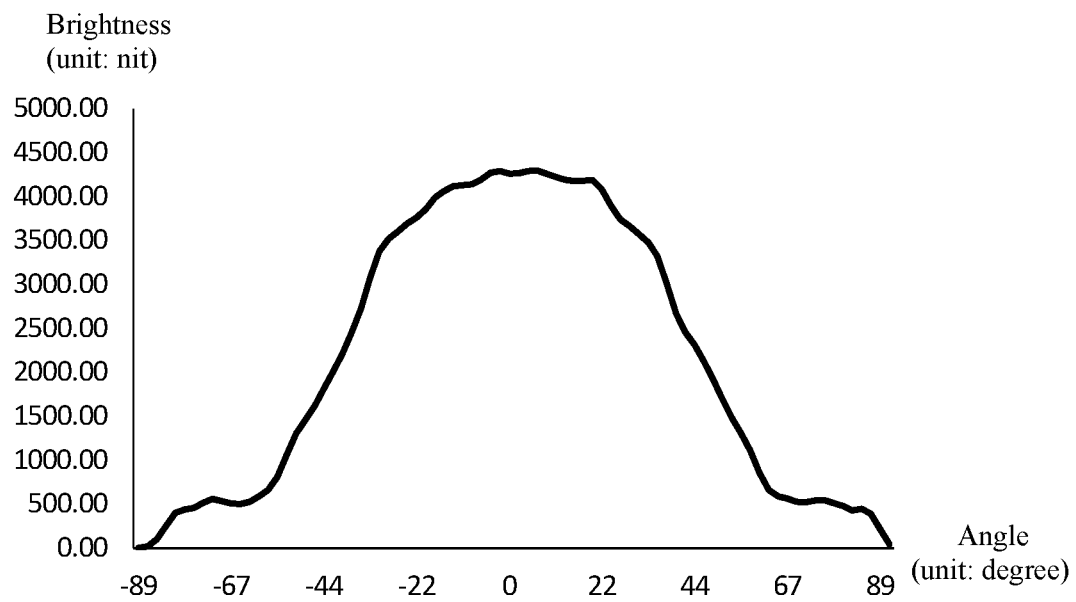
FIG. 4 shows a brightness viewing angle curve graph of the backlight module in a wide-angle mode provided by an embodiment of the present application.
Figure 5:
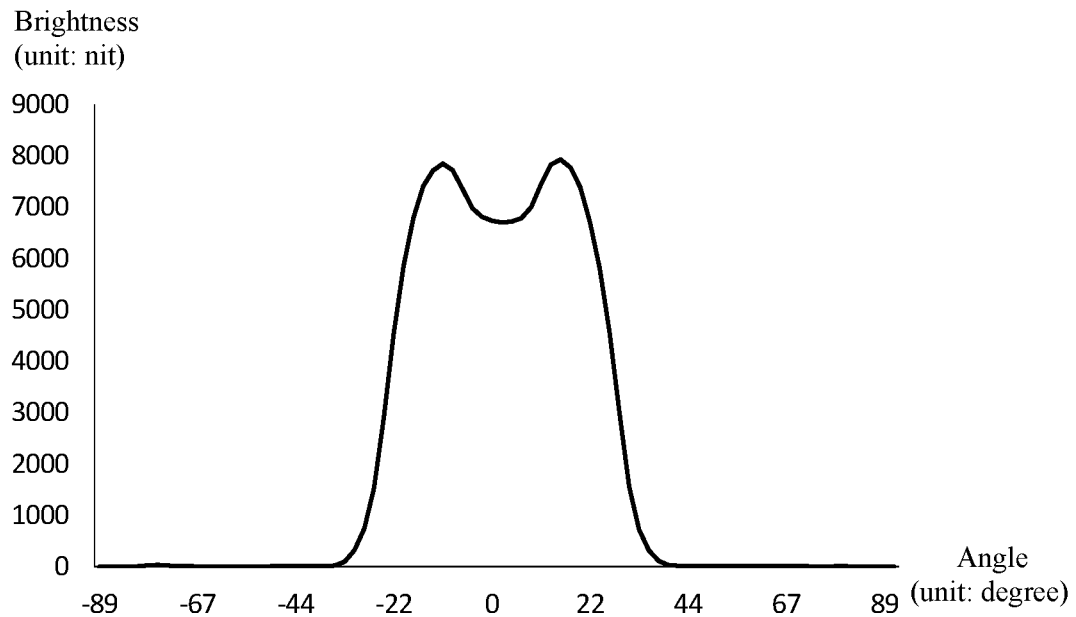
FIG. 5 shows a brightness viewing angle curve graph of the backlight module in a privacy mode provided by an embodiment of this application.
Figure 6:
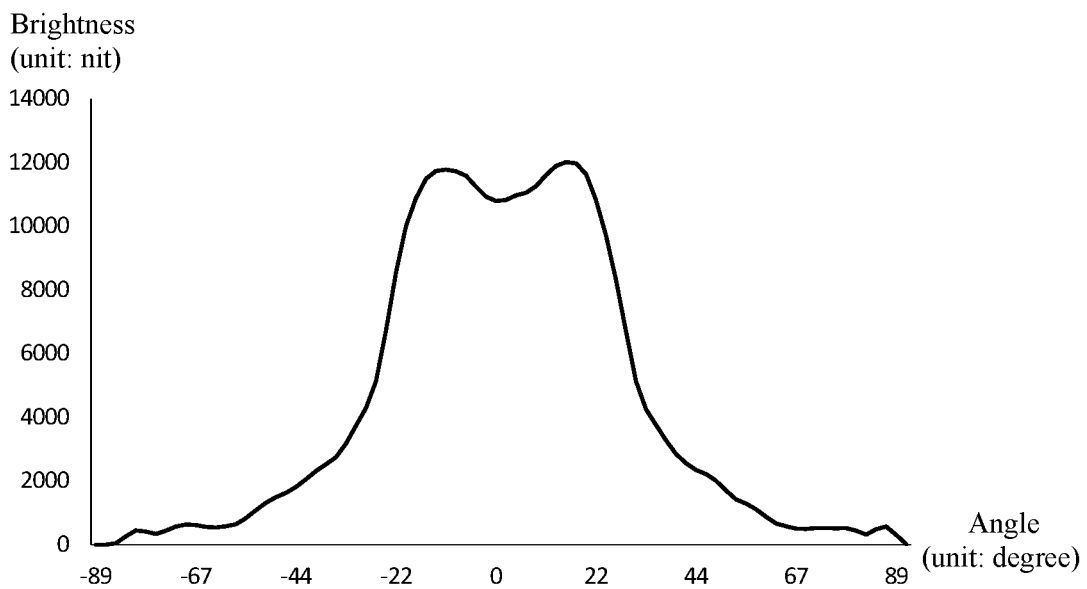
FIG. 6 shows a brightness viewing angle curve graph of the backlight module in a high-brightness mode provided by an embodiment of the present application.

Specifically, please refer to FIGS. 4 to 6. Under conditions that hardware such as the first light-emitting assembly 21 and the second light-emitting assembly 22 in the light source 2 are the same, and objective factors such as driving current for driving the first light-emitting assembly 21 and the second light-emitting assembly 22 are same, display effects of the privacy mode, the wide-angle mode, and the high-brightness mode of the backlight module are being compared, wherein in the wide-angle mode, the second light-emitting assembly 22 is driven and the first light-emitting assembly 21 is turned off. Please refer to FIG. 4, which is a brightness viewing angle curve graph of the backlight module in the wide-angle mode. In this way, an observable viewing angle is approximately in a range of (−67°~+67°), highest brightness is concentrated at zero-degree viewing angle, which means a viewing angle perpendicular to the backlight module, and the highest brightness is about 4500 nits. In the privacy mode, the first light-emitting assembly 21 is driven and the second light-emitting assembly 22 is turned off. Please refer to FIG. 5, which is a brightness viewing angle curve graph of the backlight module in the privacy mode. In this way, an observable viewing angle is approximately in a range of (−30°~+30°, and the highest brightness is about 8000 nits and is concentrated at a range from (−16°~−9° to (+9°~+16°). In addition, the brightness at the zero-degree viewing angle perpendicular to the backlight module is about 7000 nits. Apparently, compared with the wide-angle mode, in the privacy mode, not only can the observable viewing angle be reduced, but also the display brightness be increased, so that the display device has higher light energy utilization and contrast. Moreover, in the high-brightness mode, both the second light-emitting assembly 22 and the first light-emitting assembly 21 are driven at a same time. Referring to FIG. 6, which is a brightness viewing angle curve graph of the backlight module in the high-brightness mode, an observable viewing angle is the same as the observable viewing angle in the wide-angle mode. Also, the highest brightness is concentrated at a viewing angle range of (−30°~+30°). Apparently, the high-brightness mode has characteristics of both the wide viewing angle in the wide-angle mode and the high brightness in a small viewing angle range in the privacy mode.

It should be noted that the light guide structure 1 is configured to direct outward the light from the light source 2 through the specular reflection, that is, the light guide structure 1 does not use scattering or diffuse reflection to direct the light emitted by the light source 2. Apparently, when the light emitted by the first light-emitting assembly 21 is concentrated by the light receiving structure 3 within the predetermined angle range and is then directed to the light guide structure 1, scattering or diffuse reflection should be prevented from occurring in the light within the predetermined angle range, which is to be incident to the light guide structure 1. In this embodiment the light incident to the light guide structure 1 from the predetermined angle range is directed through the specular reflection, which ensures that the display device has a better privacy effect, and the light energy utilization and display contrast will not be reduced.

Figure 7:
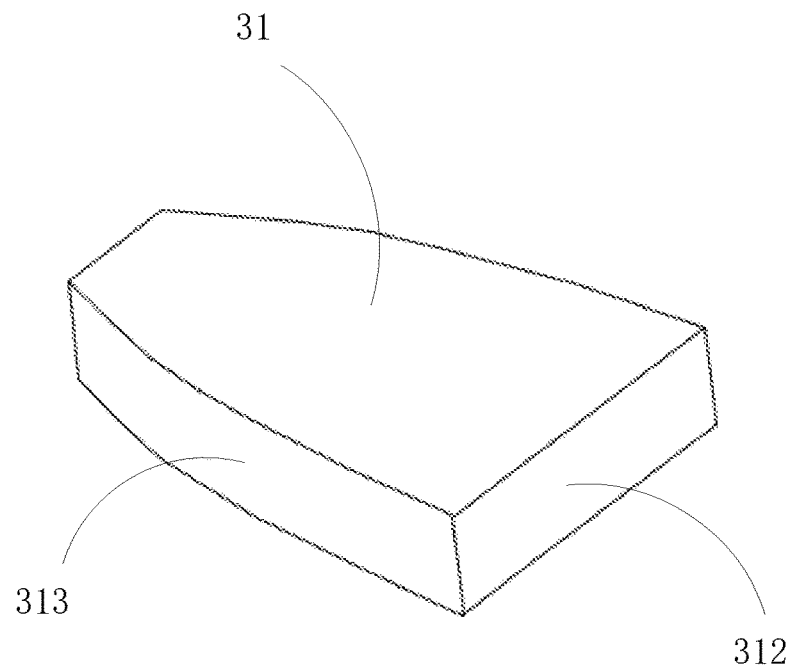
FIG. 7 is a schematic perspective structural view of a light receiving structure of the backlight module provided by an embodiment of the present application.
Figure 8:
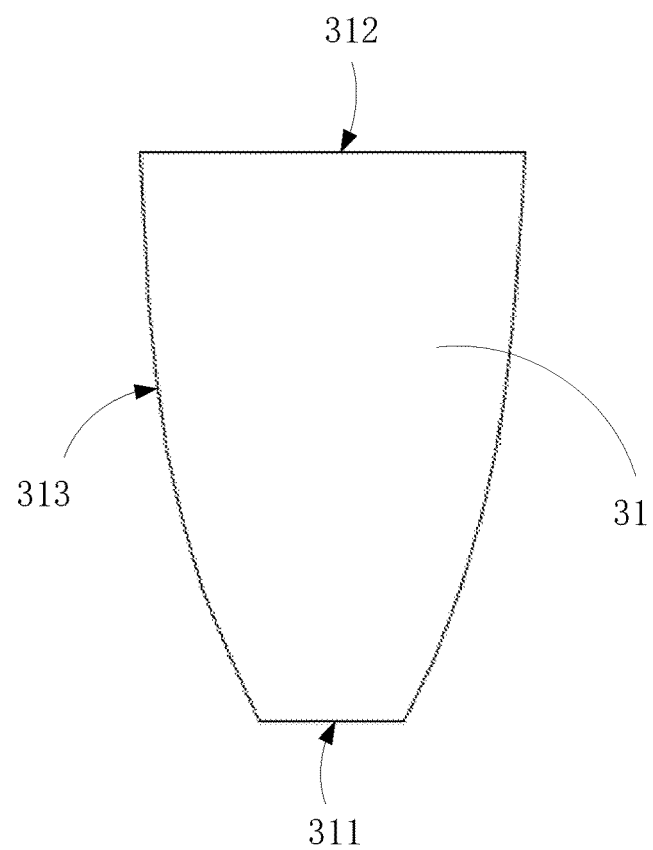
FIG. 8 is a top plan view of the light receiving structure of the backlight module provided by the embodiment of the present application.

In one embodiment, referring to FIGS. 7-8, the light receiving structure 3 includes at least a light receiving element 31 including a light incident surface 311 disposed close to the first light-emitting assembly 211, a light output surface 312 disposed close to the light guide structure 1, and a light-receiving curved surface 313 disposed between the light incident surface 311 and the light output surface 312. The light-receiving curved surface 313 concentrates light incident on the light-receiving curved surface 313 within the predetermined angle range so that the light is directed outward from the light output surface 312.

It can be understood that the light receiving element 31 includes the light incident surface 311 disposed close to the first light-emitting assembly 211, the light output surface 312 disposed close to the light guide structure 1, and the light-receiving curved surface 313 disposed between the light incident surface 311 and the light output surface 312, wherein the light incident surface 311 and the light output surface 312 are parallel to each other. The light emitted by the first light-emitting assembly 21 enters the light receiving element 31 from the light incident surface 311. When the light entering the light receiving element 31 forms an angle with respect to the light output surface 312 where the angle is within the predetermined angle range, the light entering the light receiving element 31 can be directly directed outward from the light output surface 312. When the light entering the light receiving element 31 is not at an angle within the predetermined angle range with respect to the light output surface 312, the light entering the light receiving element 31 may be reflected by the light-receiving curved surface 313 at least once, and then exit in a direction where the light entering the light receiving element 31 is at the angle within the predetermined angle range with respect to the light output surface 312.

As stated above, in this embodiment, a cross-sectional shape of the light-receiving curved surface 313 perpendicular to the light incident surface 311 or the light output surface 312 is one of a parabola, a polynomial curve, a Bezier curve, a B-spline curve, or a non-uniform rational B-spline curve. Specifically, the cross-sectional shape of the light-receiving curved surface 313 can be adjusted according to the predetermined angle range. Specifically, the predetermined angle range may be 60 degrees to 90 degrees with respect to the light output surface 312. In addition, in a direction parallel to the light incident surface 311 or the light output surface 312, a cross-section of the light receiving element 31 can be rectangular, circular, or other polygonal structures, which is not limited here.

In one embodiment, please refer to FIGS. 1 to 3. The first light-emitting assembly 21 includes a plurality of first light-emitting diode (LED) devices 211, the second light-emitting assembly 22 includes a plurality of second LED devices 221, and the light receiving structure 3 includes a plurality of the light receiving elements 31 provided in a one-to-one correspondence with the first LED devices 211.

It can be understood that the light source 2 may include a plurality of LEDs. The first light-emitting assembly 21 includes the first LED devices 211, and the second light-emitting assembly 22 includes the second LED devices 221 spaced apart from the first LED devices 211. Obviously, each of the first LED devices 211 and each of the second LED devices 221 can be evenly distributed on a side of the light guide structure 1. Furthermore, the light receiving structure 3 includes the light receiving elements 31 provided in the one-to-one correspondence with the first LED devices 211. The light receiving elements 31 and the first LED devices 211 are equal in number. In corresponding ones of the first LED devices 211 and the light receiving elements 31, the light incident surface 311 of the light receiving element 31 faces the first LED device 211, and the light output surface 312 of the light receiving element 31 faces away from the first LED device 211. Specifically, an area of the light incident surface 311 is greater than an area of an effective light-emitting surface of the first LED device 211, and an orthographic projection of the light incident surface 311 on the light guide structure 1 covers an orthographic projection of the effective light-emitting surface of the first LED device 211 on the light guide structure 1, so that the light emitted by the first LED device 211 can be directed into the light receiving element 31 in an mount as much as possible.

In one embodiment, please refer to FIG. 2. The first LED devices 211 and the second LED devices 221 are alternately arranged, and one of the second LED devices 221 is disposed between any adjacent ones of the first LED devices 211. It can be understood that the first LED devices 211 and the second LED devices 221 alternately arranged, which means that each of the second LED devices 221 is disposed between adjacent ones of the first LED devices 211, and any adjacent two of the first LED devices 211 are provided with one of the second LED devices 221 between them, thereby ensuring that the first light-emitting assembly 21 and the second light-emitting assembly 22 emit light uniformly toward the light guide structure 1. When the backlight module is in the privacy mode, only the first LED devices 211 of the first light-emitting assembly 21 are driven to emit light, and the first LED devices 211 and the second LED devices 221 are alternately arranged, which ensures that the first LED devices 211 emit light uniformly toward the light guide structure 1, thereby enabling uniform light emitted from the backlight module. Likewise, the uniform light emission of the backlight module can be achieved in the wide-angle mode or the high-brightness mode, which will not be repeated here.

In one embodiment, please refer to FIG. 1. The second LED devices 221 and the light receiving elements 31 are alternately arranged. One of the second LED devices 221 is disposed between any adjacent ones of the light receiving elements 31. It can be understood that the second LED devices 211 and the light receiving elements 31 alternately arranged, which means that each of the second LED devices 221 is disposed between adjacent ones of the light receiving elements 31, and any adjacent two of the light receiving elements 31 are provided with one of the second LED devices 221 between them. By arranging the second LED device 221 between adjacent ones of the light receiving elements 31, a portion of the light emitted by the LED devices can be prevented from being blocked by the light receiving elements 31, thereby ensuring the light energy utilization. In this embodiment, the first LED devices 211 and the second LED devices 221 are arranged in two rows. The first LED devices 211 are arranged at a side of the light incident surface 311 of the light receiving element 31. The second LED devices 221 and the light receiving elements 31 are arranged side by side. Specifically, a distance from the second LED device 221 to the light guide structure 1 is less than or equal to a distance from the light receiving element 31 to the light guide structure 1. Specifically, an effective light-emitting surface of the second LED device 221 may be coplanar with the light output surface 312 of the light receiving element 31.

In one embodiment, please refer to FIGS. 3, 9, 10, and 11. The light guide structure 1 includes a reflective bottom surface 11, a light output surface 12 located on a side opposite to the reflective bottom surface 11, and a light introducing surface 13 located between the reflective bottom surface 11 and the light output surface 12 and close to one side of the light source 2.

Specifically, the reflective bottom surface 11 includes at least a reflective surface protruding outward from the light guide structure 1. The reflective surface is disposed at an acute angle with respect to the light output surface 12 and the light introducing surface 13.

It can be understood that the light guide structure 1 is configured to direct outward the light emitted by the light source 2 through the specular reflection, that is, the light guide structure 1 does not use scattering or diffuse reflection to direct the light emitted by the light source 2. Therefore, when the light emitted by the first light-emitting assembly 21 is concentrated by the light receiving structure 3 within the predetermined angle range and is then directed to the light guide structure 1, scattering or diffuse reflection should be prevented from occurring in the light incident to the light guide structure 1, so at least a reflective surface protruding outward from the light guide structure 1 is disposed on a bottom surface of the light guide structure to enable the light incident to the inside of the light guide structure 1 to exit the light output surface 12 through the specular reflection, thereby increasing light energy utilization and display contrast.

Figure 9:
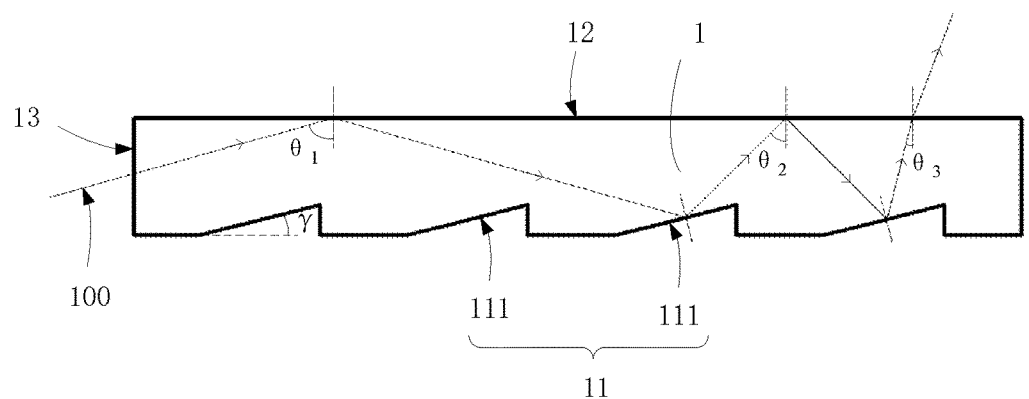
FIG. 9 is a schematic light path view of a light guide structure of the backlight module in a first cross-section provided by an embodiment of the present application.
Figure 10:
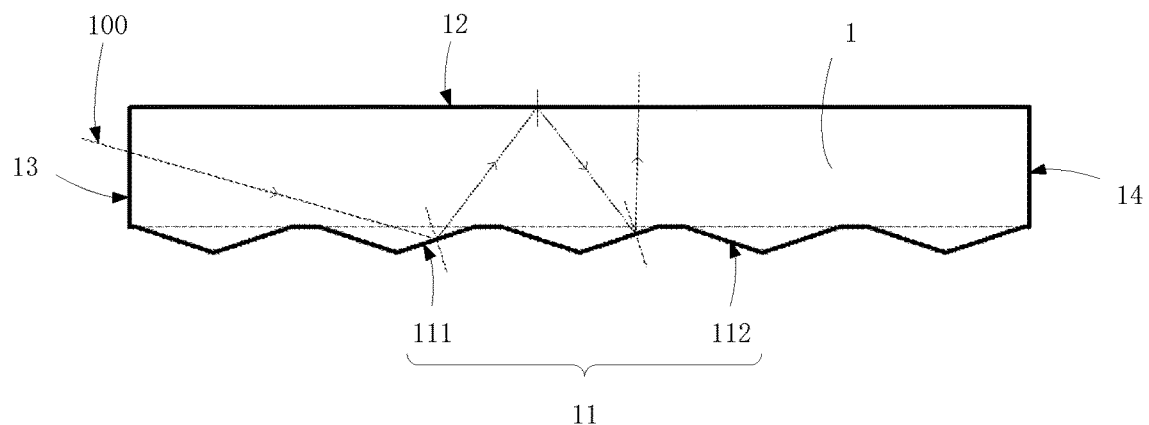
FIG. 10 is a first schematic light path view of a light guide structure of the backlight module in a second cross-section provided by an embodiment of the present application.

In this embodiment, the reflective bottom surface 11 includes a plurality of first reflective surfaces 111 arranged in an array, and each of the first reflective surfaces 111 is configured to direct outward the light incident from the light introducing surface 13 to exit the light output surface 12. It can be understood that each of the first reflective surfaces 111 is arranged in a direction toward the light introducing surface 13 and the light output surface 12. The first reflective surfaces 111 are configured to direct the light incident from the light introducing surface 13 to exit the light output surface 12, that is, each of the first reflective surfaces 111 is located at an acute angle with respect to the light introducing surface 13 and the light output surface 12. In this embodiment, referring to FIGS. 9 to 10, the first reflective surface 111 may form a small angle with respect to the light output surface 12. A first incident light 100 that forms a small angle with respect to the light output surface 12 may be directed out of the light output surface 12 after being reflected at least once in the light guide structure 1 through the first reflective surface 111. For example, the first incident light 100 may be a light that passes through the light receiving element 31 and enters from the light introducing surface 13, and the first incident light 100 is directed out of the light output surface 12 after at least one reflection. Specifically, after each time the first incident light 100 is reflected on the first reflecting surface 111, an incident angle of the first incident light 100 will decrease according to an angle between the first reflecting surface 111 and the light output surface 12, until a critical angle condition with respect to the light output surface 12 is satisfied, the light is emitted out of the light output surface 12, wherein an included angle between the first reflective surface 111 and the light output surface 12 is greater than 4 degrees and less than 10 degrees. Referring to FIG. 9, an angle between the first reflective surface 111 and the light output surface 12 is $\gamma=5$ degrees, and an initial incident angle of the first incident light 100 is $\theta 1$. After first total reflection on the light output surface 12, the first incident light 100 is reflected on the light output surface 12 through one of the first reflective surfaces 111 for second total reflection. At this time, an incident angle of the second total reflection is $\theta 2=\theta 1-2\gamma$. Then, the first incident light 100 is reflected on the light output surface 12 through another one of the first reflective surface 111 for third total reflection. At this time, an incident angle of the third total reflection is $\theta 3=\theta 1-4\gamma$, and after the incident angle $\theta 3$ of the third total reflection is smaller than the critical angle with respect to the light output surface 12, the first incident light 100 is emitted out of the light output surface 12. Likewise, please refer to FIG. 10, which is a light path view of the first incident light 100 passing through a light guide structure 1 with another configuration, which will not be repeated here. It should be noted that an angle between the first incident light 100 and the light output surface 12 when the first incident light 100 is initially irradiated to the light guide structure 1 may be within the predetermined angle range. Specifically, when the first incident light 100 is initially irradiated to the light guide structure 1, an angle between the first incident light 100 and the light output surface 12 ranges from 0 degrees to 30 degrees. Since the included angle between the first incident light 100 and the light output surface 12 is complementary to the initial incident angle $\theta 1$ of the first incident light 100, a value range of the initial incident angle $\theta 1$ of the first incident light 100 is greater than 60 degrees and less than 90 degrees.

Figure 11:
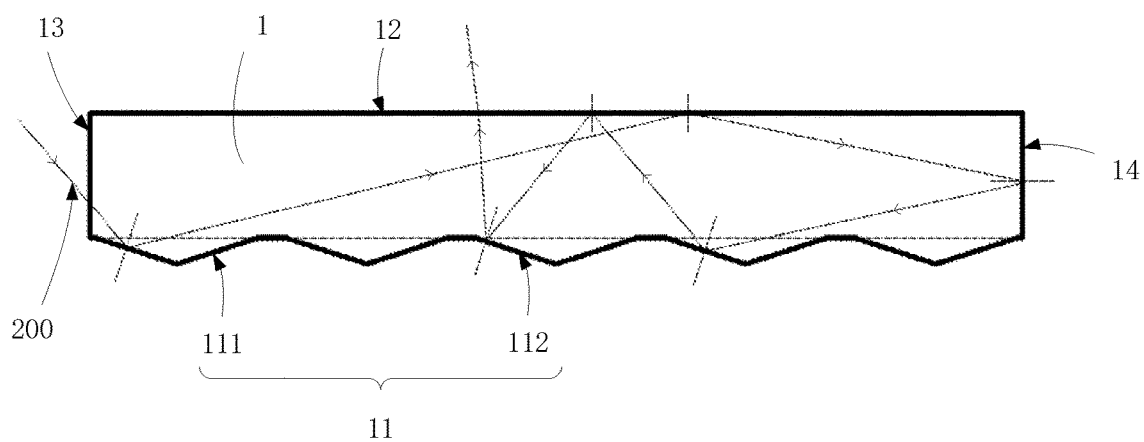
FIG. 11 is a second schematic light path view of a light guide structure of the backlight module in the second cross-section provided by the embodiment of the present application.

In one embodiment, please refer to FIG. 11. the reflective bottom surface further includes a plurality of second reflective surfaces 112 facing away from the light introducing surface 13 and disposed in a direction toward the light output surface 112. The first reflective surfaces 111 and the second reflective surfaces 112 are connected, respectively, and are disposed symmetrically with respect to each other. The light guide structure 1 further includes a specular reflection surface 14 that cooperates with the second reflective surface 112. The specular reflection surface 14 is located opposite to the light introducing surface 13. It can be understood that the second reflective surfaces 112 are configured to face away from the light introducing surface 13 and are disposed in the direction toward the light output surface 112. That is, each of the second reflective surfaces 112 forms an obtuse angle with the light introducing surface 13 and an acute angle with the light output surface 12. The specular reflection surface 14 cooperates with the second reflective surfaces 112. The second reflective surfaces 112 each can direct the second incident light 200 that forms a larger angle with respect to the light output surface 12 after being reflected several times by the second reflective surfaces 112 and the specular reflection surface 14 to be out of the light output surface 12. Specifically, the output of the second incident light 200 from the light output surface 12 can be divided into two stages. In a first stage, the second incident light 200 undergoes at least one total reflection on the second reflective surface 112 and/or the light output surface 12 and then is specularly reflected on the specular reflection surface 14. In a second stage, after the second incident light 200 is specularly reflected on the specular reflection surface 14, the second incident light 200 forms a small angle with respect to the light output surface 12 and is irradiated to the second reflective surface 112. Then, the second incident light 200 is reflected at least once between the second reflective surface 112 and the light output surface 12, and then is directed out of the light output surface 12. Specifically, in the second stage, after each time the second incident light 200 is reflected on the second reflecting surface 112, an incident angle of the second incident light 200 will decrease according to an angle between the second reflecting surface 112 and the light output surface 12, until a critical angle condition with respect to the light output surface 12 is satisfied. For details, please refer to FIGS. 9-10, that is, referring to the light path view of the first incident light 100 output from the light output surface 12, which will not be repeated here.

Figure 13:
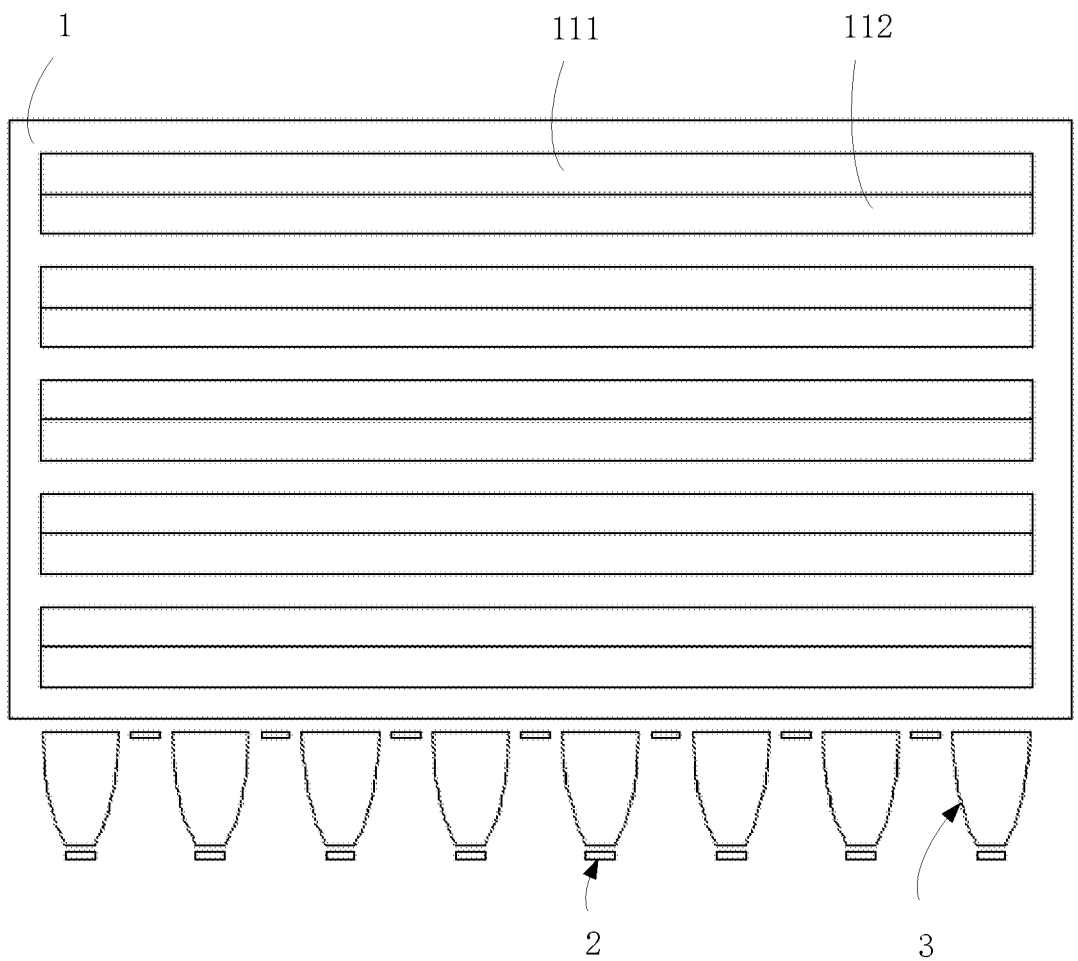
FIG. 13 is a first top plan view of a light guide structure of a backlight module provided by an embodiment of the present application.
Figure 14:
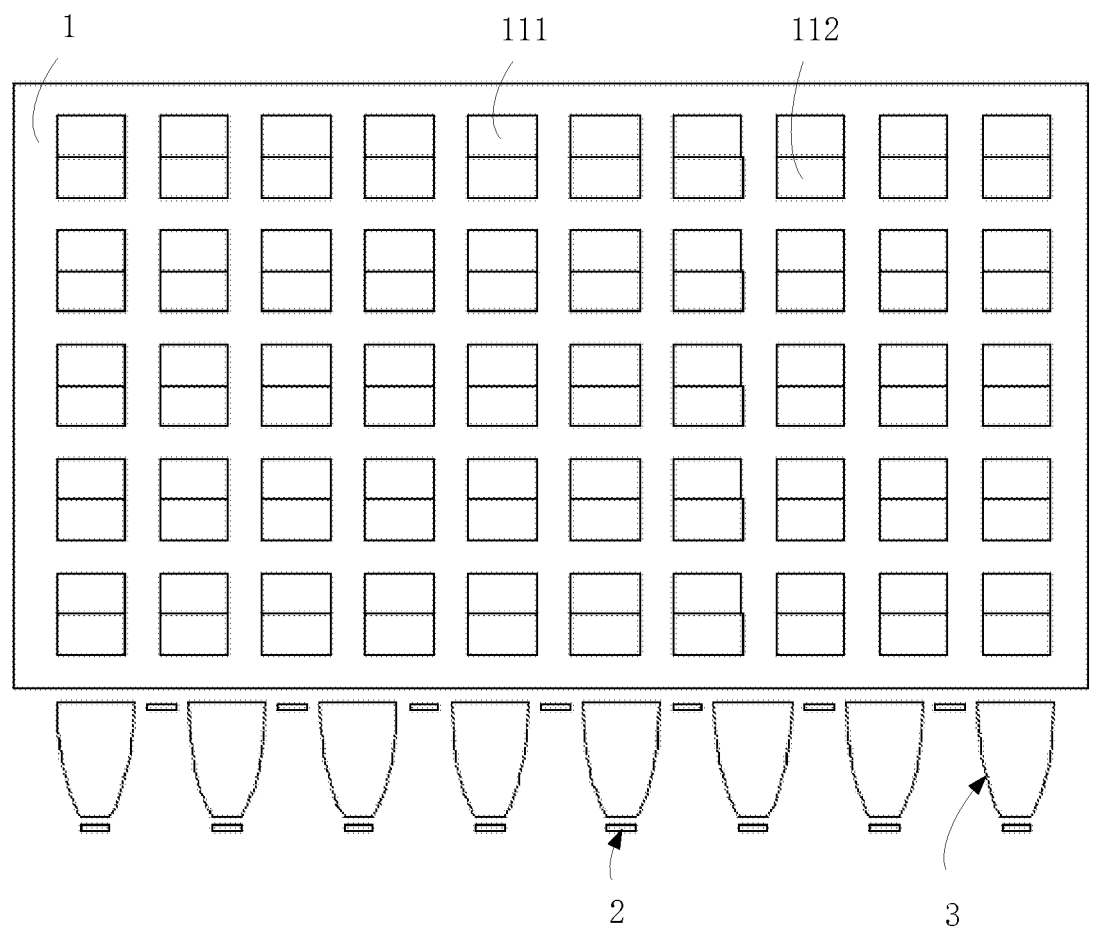
FIG. 14 is a second top plan view of a light guide structure of a backlight module provided by an embodiment of the present application.
Figure 15:
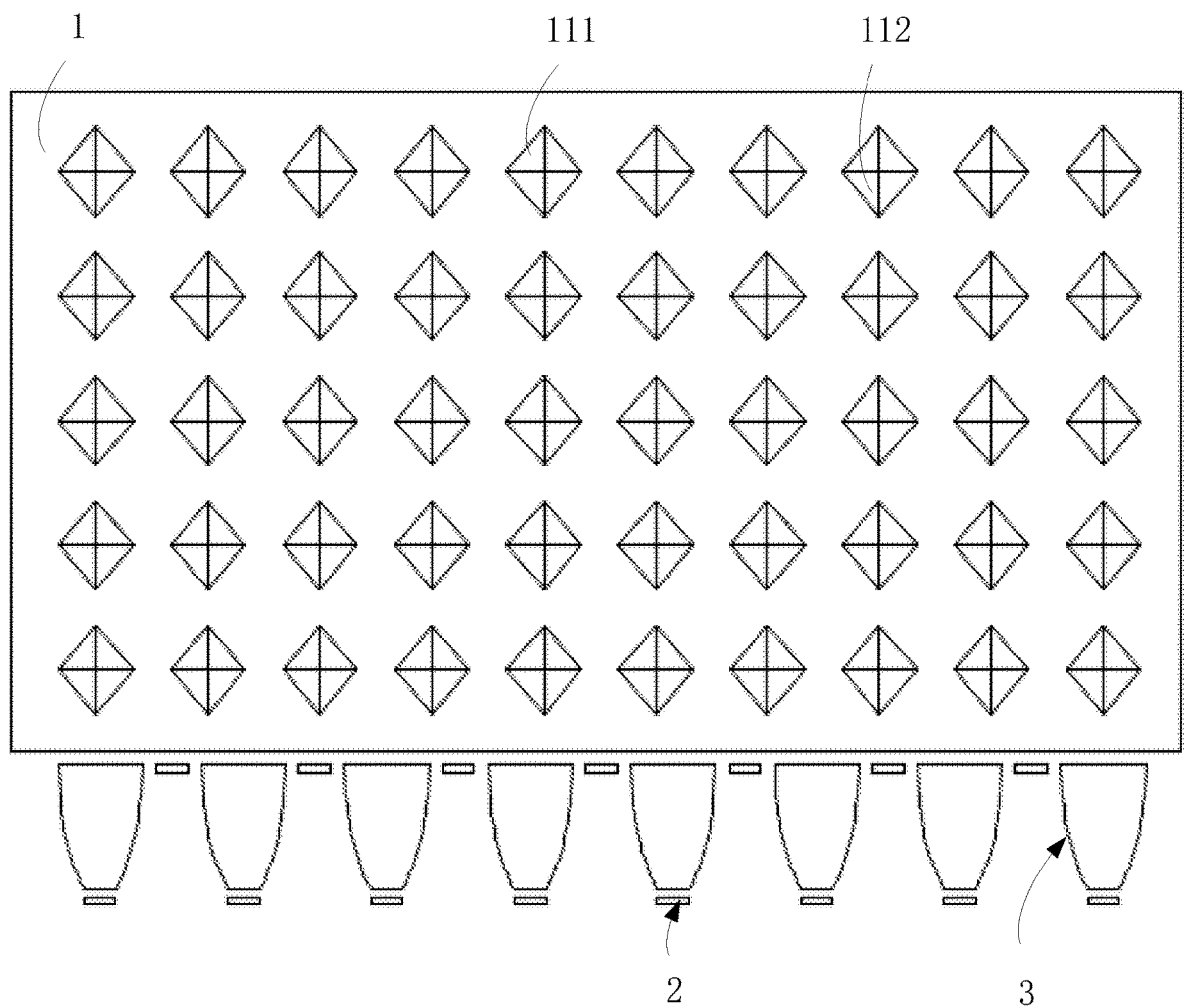
FIG. 15 is a third top plan view of a light guide structure of a backlight module provided by an embodiment of the present application.
Figure 16:
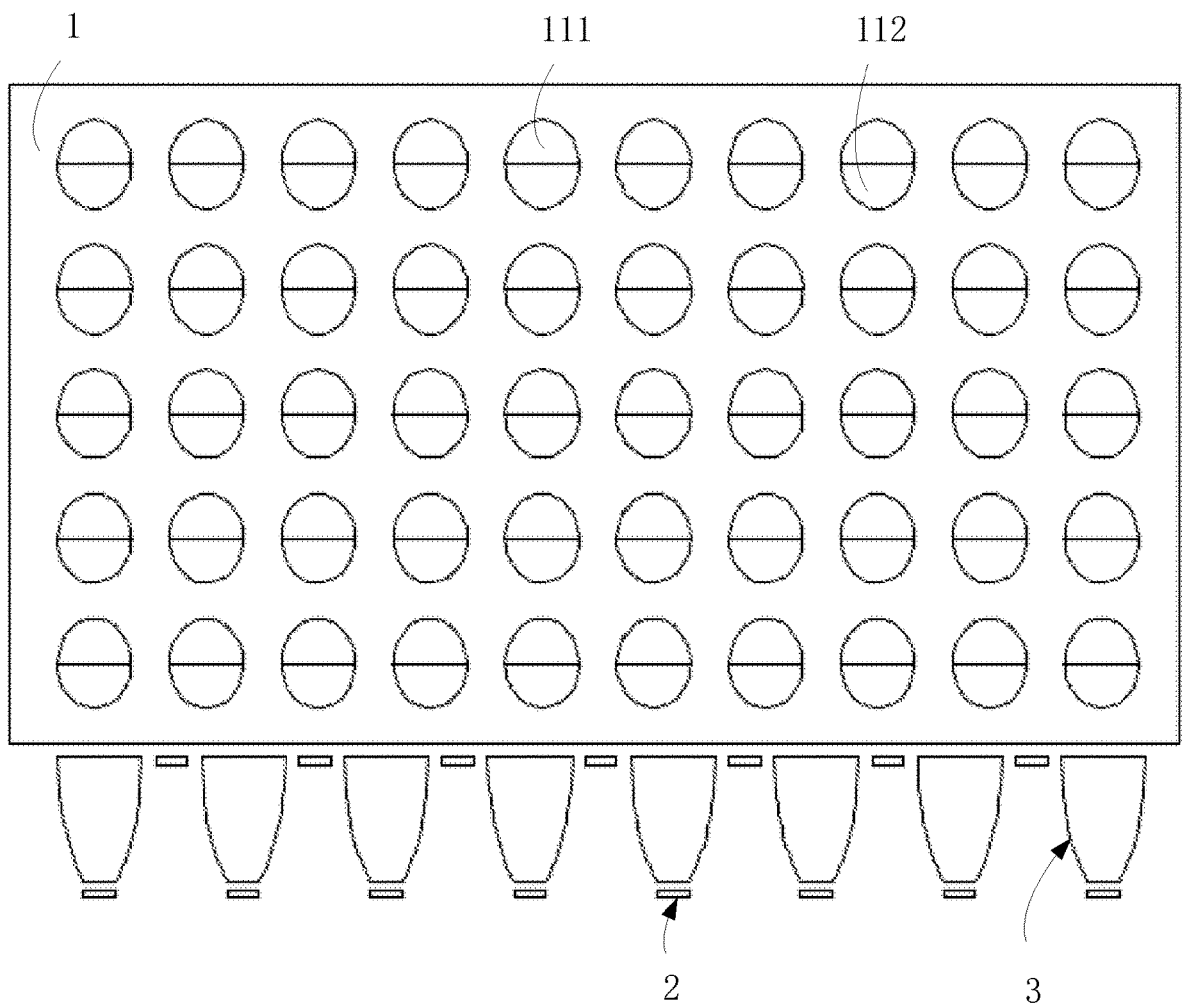
FIG. 16 is a fourth top plan view of a light guide structure of a backlight module provided by an embodiment of the present application.

In one embodiment, please refer to FIGS. 13 to 16. The reflective bottom surface 11 includes a plurality of the first reflective surfaces 111 arranged in an array. In addition, the reflective bottom surface 11 further includes a plurality of the second reflective surfaces 112. Each of the first reflective surfaces 111 corresponds to one of the second reflective surfaces 112. In a corresponding arrangement of the first reflective surface 111 and the second reflective surface 112, the first reflective surface 111 and the second reflective surface 112 are disposed symmetrically with respect to each other. It should be noted that the first reflective surface 111 and the second reflective surface 112 may be provided in a concave or convex form at a bottom of the light guide structure 1. In this embodiment, unless otherwise specified, the first reflective surface 111 and the second reflective surface 112 are exemplified in a form that the first reflective surface 111 and the second reflective surface 112 protruding outward from the bottom of the light guide structure 1. Referring to FIG. 13, the first reflective surfaces 111 may be elongated in shape. In this fashion, the first reflective surfaces 111 are arranged parallel to each other in a single row. Correspondingly, the second reflective surfaces 112 may also be elongated in shape. Referring to FIGS. 14-15, the first reflective surfaces 111 and the second reflective surfaces 112 are arranged in an array, and the first reflective surface 111 and the second reflective surface 112 may be V-shaped. Furthermore, referring to FIG. 16, under conditions that the second reflective surfaces 112 are provided to face away from the light introducing surface 13 and are disposed in the direction toward the light output surface 112, and the first reflective surfaces 111 are arranged in the direction toward the light introducing surface 13 and the light output surface 12, the first reflective surfaces 111 and the second reflective surfaces 112 may also be curved surfaces, which are not limited here.

Figure 12:
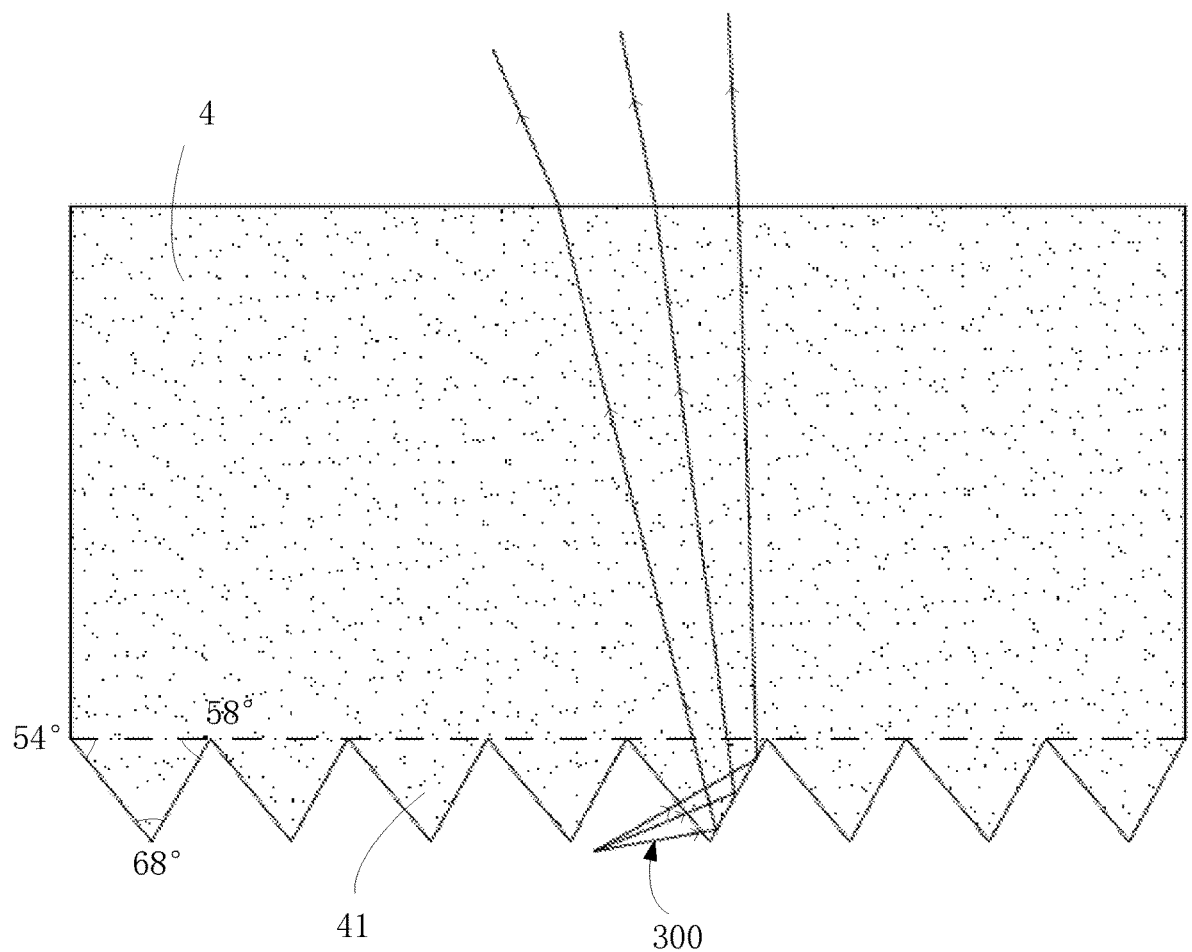
FIG. 12 is a schematic structural view of a reverse prism sheet of a backlight module provided by an embodiment of the present application.

In one embodiment, please refer to FIG. 12. The backlight module further includes a reverse prism sheet 14. The reverse prism sheet 14 is disposed on a side of the light guide structure 1 close to the light output surface 12. The reverse prism sheet 4 is configured to collimate a third incident light 300 emitted from the light guide structure 1. Specifically, the reverse prism sheet 4 has a plurality of reverse prism blocks 41 protruding from one side close to the light guide structure 1. Referring to FIG. 12, the third incident light 300 is collimated under the action of the reverse prism blocks 41, and the reverse prism blocks 41 may be triangular in cross-section. Specifically, the triangle is an acute triangle with three internal angles of 68 degrees, 54 degrees, and 58 degrees, respectively. The internal angle on the side close to the light guide structure 1 is 68 degrees. In addition, referring to FIG. 3, a specular reflection sheet 5 is further disposed on a side of the light guide structure 1 away from the reverse prism sheet 4. Apparently, the specular reflection sheet 5 faces a light output direction of the backlight module, and is configured to reflect a light leaking from the light guide structure 1 toward the light output direction of the backlight module, thereby further improving the light energy utilization of the backlight module.

An embodiment of the present application further provides a display device, which includes the backlight module as described in the aforementioned embodiments, and a display panel disposed on the backlight module.

In this embodiment, a light source 2 is divided into a first light-emitting assembly 21 and a second light-emitting assembly 22, and a light receiving structure 3 is disposed between the first light-emitting assembly 21 and the light guide structure 1. By using the light receiving structure 3 to concentrate light emitted by the first light-emitting assembly 21 within a predetermined angle range such that the light is incident to an inside of the light guide structure 1, in cooperation with the light guide structure 1 to direct outward the light through specular reflection, and on the basis of a privacy display function, the display device can have higher light energy utilization and contrast. Furthermore, by switching working states of the first light-emitting assembly 21 and the second light-emitting assembly 22, a privacy display effect with a switchable viewing angle is also achieved.

Accordingly, although the present invention has been disclosed as the aforementioned preferred embodiments, they are not intended to limit the present invention. Those skilled in the art without departing from the scope of the present invention may make various changes or modifications, and thus the scope of the present invention should be after the appended claims and their equivalents.

What is claimed is:

1. A backlight module, comprising:
 a light source comprising a first light-emitting assembly and a second light-emitting assembly;
 a light receiving structure disposed behind and corresponding to a position of the first light-emitting assembly and configured to concentrate light emitted by the first light-emitting assembly within a predetermined angle range so that the light is directed outward from the light receiving structure;
 a light guide structure disposed behind and corresponding to a position of the light receiving structure and configured to direct outward the light concentrated in the light receiving structure through specular reflection;
 a reverse prism sheet disposed on one side of the light guide structure close to the light output surface, the reverse prism sheet comprising a plurality of reverse prism blocks protruding from one side of the reverse prism sheet close to the light guide structure; and
 a specular reflection sheet disposed at a bottom of the light guide structure and arranged on one side of the light guide structure away from the reverse prism sheet;
 wherein the light receiving structure comprises a plurality of light receiving elements comprising a light incident surface disposed close to the first light-emitting assembly, the light receiving elements are disposed between the light guide structure and the first light-emitting assembly, a light output surface disposed close to the light guide structure, and a light-receiving curved surface disposed between the light incident surface and the light output surface; the light-receiving curved surface concentrates light incident on the light-receiving curved surface within the predetermined angle range so that the light is directed outward from the light output surface; and a cross-sectional shape of the light-receiving curved surface perpendicular to the light incident surface or the light output surface is a non-linear and bending curve;
 wherein the first light-emitting assembly comprises a plurality of first light-emitting diode (LED) devices, the second light-emitting assembly comprises a plurality of second LED devices, the first LED devices are provided in a one-to-one correspondence with the light receiving elements, the first LED devices and the second LED devices are alternately arranged, and each of the second LED devices is disposed between adjacent ones of the first LED devices and between adjacent ones of the light receiving elements.

2. The backlight module of claim 1, wherein the cross-sectional shape of the light-receiving curved surface perpendicular to the light incident surface or the light output surface is one of a parabola, a polynomial curve, a Bezier curve, or a B-spline curve.

3. The backlight module of claim 1, wherein the light guide structure comprises a reflective bottom surface, a light output surface located on a side opposite to the reflective bottom surface, and a light introducing surface located between the reflective bottom surface and the light output surface and close to one side of the light source; and
 wherein the reflective bottom surface comprises at least a reflective surface protruding outward from the light guide structure, and the reflective surface is disposed at an acute angle with respect to the light output surface and the light introducing surface.

4. The backlight module of claim 3, wherein the reflective bottom surface comprises a plurality of first reflective surfaces arranged in an array, and each of the first reflective surfaces is configured to direct the light incident from the light introducing surface to exit the light output surface.

5. The backlight module of claim 4, wherein the reflective bottom surface further comprises a plurality of second reflective surfaces facing away from the light introducing surface and disposed in a direction toward the light output surface, wherein the first reflective surfaces and the second reflective surfaces are connected and disposed symmetrically with respect to each other;
 wherein the light guide structure further comprises a specular reflection surface disposed in cooperation with the second reflection surface and located opposite to the light introducing surface.

6. The backlight module of claim 1, further comprising a privacy mode, a wide-angle mode, wherein in the wide-angle mode, the second light-emitting assembly is driven and the first light-emitting assembly is turned off; in the privacy mode, the first light-emitting assembly is driven and the second light-emitting assembly is turned off.

7. The backlight module of claim 1, further comprising a high-brightness mode, wherein in the high-brightness mode, both the second light-emitting assembly and the first light-emitting assembly are driven at a same time.

8. A display device, comprising a backlight module and a display panel disposed on the backlight module, wherein the backlight module comprises:
- a light source comprising a first light-emitting assembly and a second light-emitting assembly;
- a light receiving structure disposed behind and corresponding to a position of the first light-emitting assembly and configured to concentrate light emitted by the first light-emitting assembly within a predetermined angle range so that the light is directed outward from the light receiving structure;
- a light guide structure disposed behind and corresponding to a position of the light receiving structure and configured to direct outward the light concentrated in the light receiving structure through specular reflection;
- a reverse prism sheet disposed on one side of the light guide structure close to the light output surface, the reverse prism sheet comprising a plurality of reverse prism blocks protruding from one side of the reverse prism sheet close to the light guide structure; and
- a specular reflection sheet disposed at a bottom of the light guide structure and arranged on one side of the light guide structure away from the reverse prism sheet,
- wherein the light receiving structure comprises a plurality of light receiving elements comprising a light incident surface disposed close to the first light-emitting assembly, the light receiving elements are disposed between the light guide structure and the first light-emitting assembly, a light output surface disposed close to the light guide structure, and a light-receiving curved surface disposed between the light incident surface and the light output surface; the light-receiving curved surface concentrates light incident on the light-receiving curved surface within the predetermined angle range so that the light is directed outward from the light output surface; and a cross-sectional shape of the light-receiving curved surface perpendicular to the light incident surface or the light output surface is a non-linear and bending curve;
- wherein the first light-emitting assembly comprises a plurality of first light-emitting diode (LED) devices, the second light-emitting assembly comprises a plurality of second LED devices, the first LED devices are provided in a one-to-one correspondence with the light receiving elements; the first LED devices and the second LED devices are alternately arranged, and each of the second LED devices is disposed between adjacent ones of the first LED devices and between adjacent ones of the light receiving elements.

9. The display device of claim 8, wherein the cross-sectional shape of the light-receiving curved surface perpendicular to the light incident surface or the light output surface is one of a parabola, a polynomial curve, a Bezier curve, or a B-spline curve.

10. The display device of claim 8, wherein the light guide structure comprises a reflective bottom surface, a light output surface located on a side opposite to the reflective bottom surface, and a light introducing surface located between the reflective bottom surface and the light output surface and close to one side of the light source;
- wherein the reflective bottom surface comprises at least a reflective surface protruding outward from the light guide structure, and the reflective surface is disposed at an acute angle with respect to the light output surface and the light introducing surface.

11. The display device of claim 10, wherein the reflective bottom surface comprises a plurality of first reflective surfaces arranged in an array, and each of the first reflective surfaces is configured to direct the light incident from the light introducing surface to exit the light output surface.

12. The display device of claim 11, wherein the reflective bottom surface further comprises a plurality of second reflective surfaces facing away from the light introducing surface and disposed in a direction toward the light output surface, wherein the first reflective surfaces and the second reflective surfaces are connected and disposed symmetrically with respect to each other;
- wherein the light guide structure further comprises a specular reflection surface disposed in cooperation with the second reflection surface and located opposite to the light introducing surface.

13. The display device of claim 8, further comprising a privacy mode, a wide-angle mode, wherein in the wide-angle mode, the second light-emitting assembly is driven and the first light-emitting assembly is turned off; in the privacy mode, the first light-emitting assembly is driven and the second light-emitting assembly is turned off.

14. The display device of claim 8, further comprising a high-brightness mode, wherein in the high-brightness mode, both the second light-emitting assembly and the first light-emitting assembly are driven at a same time.

* * * * *